United States Patent [19]

Coleman et al.

[11] 3,939,010

[45] Feb. 17, 1976

[54] MANGANESE DIOXIDE CATHODE

[75] Inventors: John Ralph Coleman, Ottawa, Canada; Torstein Valand, Skedsmokorset, Norway

[73] Assignee: Her Majesty the Queen in right of Canada, as represented by the Minister of National Defence, Ottawa, Canada

[22] Filed: Sept. 25, 1973

[21] Appl. No.: 400,664

[30] Foreign Application Priority Data

Oct. 2, 1975 United Kingdom............... 45358/75

[52] U.S. Cl. ............... 136/114; 136/102; 136/107; 136/138
[51] Int. Cl.² ......................................... H01M 6/30
[58] Field of Search............ 136/138, 139, 6 R, 126, 136/107, 118, 64, 65, 19, 112, 113, 114, 90

[56] References Cited
UNITED STATES PATENTS

| | | | |
|---|---|---|---|
| 753,383 | 3/1904 | Frank...................................... | 136/64 |
| 3,040,114 | 6/1962 | Huber............................. | 136/107 X |
| 3,060,254 | 10/1962 | Urry................................ | 136/138 X |
| 3,335,032 | 8/1967 | Barnes............................. | 136/26 X |
| 3,751,301 | 8/1973 | Kelduff.............................. | 136/26 |
| 3,825,446 | 7/1974 | Oka................................. | 136/114 |

Primary Examiner—Patrick P. Garvin
Assistant Examiner—John F. Niebling
Attorney, Agent, or Firm—Christen & Sabol

[57] ABSTRACT

Improved cathodes for use in acid Leclanche cells, particularly of the reserve type where sulphuric acid is added to activate the cell prior to use, are constructed using an anodized lead current collector which possesses advantages over other materials in being less bulky than carbon, cheaper than platinum and giving a steadier output voltage than un-anodized lead, while still being resistant to corrosion.

5 Claims, 7 Drawing Figures

MANGANESE DIOXIDE CATHODE

The present invention relates to improvements in manganese dioxide cathodes suitable for use in manganese dioxide-zinc acid electrolytic cells, and to cells or batteries incorporating the improved cathodes. The cathodes are intended more particularly for reserve primary cells which are activated just prior to use by the addition of the electrolyte.

BACKGROUND OF THE INVENTION

The conventional Leclanche cells which are widely employed as primary dry cells for flashlights and other uses make use of a metallic zinc anode which is normally the can used as a container for the cell, and a manganese dioxide cathode together with an electrolyte which is essentially ammonium chloride together with some zinc chloride, often in a gelled or paste condition. Electrically conductive carbon such as graphite is added to the manganese dioxide to increase the conductivity thereof and a carbon rod is often used as the current collector for the cathode. Alkaline Leclanche cells are also known, the electrolyte here being potassium hydroxide. A disadvantage of these systems is that a rather small fraction of the theoretically available oxidation capacity of the manganese dioxide is actually used. The end-product of discharge approximates in composition, or approximates at least in oxidation state, to $Mn_2O_3$; that is the valence state of the manganese is reduced from a nominal value of 4 (if the manganese dioxide is stoichiometric $MnO_2$) to about 3. Actually the manganese dioxide always contains less than the stoichiometric amount required by the formula $MnO_2$ and therefore the valence change in practice is less than unity. To overcome some of the disadvantages of the conventional and alkaline Leclanche cells, and acid Leclanche system has also been proposed wherein the electrolyte is sulphuric acid and the zinc anode is amalgamated to reduce corrosion which takes place even when the cell is not under load. The acid Leclanche cell has an open circuit potential or E.M.F. of nearly 2.2 volts and the working voltage on moderate range starts at 2.0 to 2.05 volts. A large fraction of the active material is used over a 10% voltage drop to 2.0 to 1.8 volts.

Where cells of these types must be made very compact, carbon rods are an undesirably bulky current collector and accordingly it would be desirable to employ current collectors of higher electrical conductivity, which in practice means metallic current collectors. However, a number of materials have been tried, including silver and platinum, but most metals suffer from severe corrosion, particularly in the acid system, and this leads to premature failure in the cells. From the performance point of view, plantinum was found to be satisfactory but is undesirably expensive.

SUMMARY OF THE INVENTION

The present invention is based on the discovery that anodized lead is also a satisfactory material for the cathode collector in manganese dioxide-zinc electrolytic cells, and is moreover a relatively cheap material. Un-anodized lead has been found to cause considerable voltage irregularities in the cells upon discharge.

According to the invention, there is provided a cathode suitable for use in acid Leclanche cells which comprise an anodized lead current collector having adhered to the anodic film a conductive compressed cathodic layer of manganese dioxide and carbon. The thickness of the anodic film on said current collector being not greater than that which would be produced by anodization in 8 Normal sulphuric acid with the passage of 18,000 millicoulombs of electricity per square inch of lead surface. The invention also includes a reserve primary cell of the acid Leclanche type comprising a cathode as defined above and an amalgamated zinc anode mounted in a container, said cell being constructed to be activatable by addition of sulphuric acid as electrolyte.

According to the invention there is also provided a method for the preparation of cathodes suitable for use in acid Leclanche cells which comprises anodizing a lead current collector in sulphuric acid and providing on said anodized current collector an adherent conductive compressed cathodic layer of manganese dioxide and carbon, said anodization being carried out to form an anodic film of thickness not greater than that which would be produced by anodization in 8 Normal sulphuric acid with the passage of 18,000 millicoulombs of electricity per square inch of lead surface.

BRIEF DESCRIPTION OF THE DRAWINGS

In the accompanying drawings,

FIGS. 1 and 2 represent discharge curves for cells employing respectively un-anodized lead and anodized lead as cathode current collectors, while

The voltage irregularities normally encountered with the unanodized lead are illustrated in FIG. 1 which shows two typical discharge curves of 1 inch × 1 inch cathodes at 120 mA current v amalgamated zinc anodes in SN $H_2SO_4$. In FIG. 2, there are shown the discharge curves of two typical cathodes wherein the lead foil current collectors have previously been anodized at 120 mA for 2 ½ minutes. Apart from this difference the conditions are comparable to those for FIG. 1.

In FIG. 3 there is illustrated a cross section taken through an anodized lead foil having active cathodic material pasted on both sides. The lead foil current collector 10 is shown bearing the anodic layers 11 which in turn bear the cathodic material layers 12 comprising manganese dioxide and graphite.

FIG. 4 represents a plan view of a lead foil 14 perforated with many small holes 15 to promote adhesion of the cathode material when applied.

FIG. 5 represents a cross section through a cathode employing such a perforated lead foil (see FIG. 4) showing the lead 14, anodic film 16 and cathode material 17.

FIG. 6 represents a plan view of an alternative lead current collector in the form of an expanded sheet showing the lead 14 and openings 18.

FIG. 7 represents a cross section through a cathode employing such an expanded lead sheet (see FIG. 6) showing the lead 14, anodic anodic layer 16 and cathode material 17.

DESCRIPTION OF PREFERRED EMBODIMENTS

Figure 1:
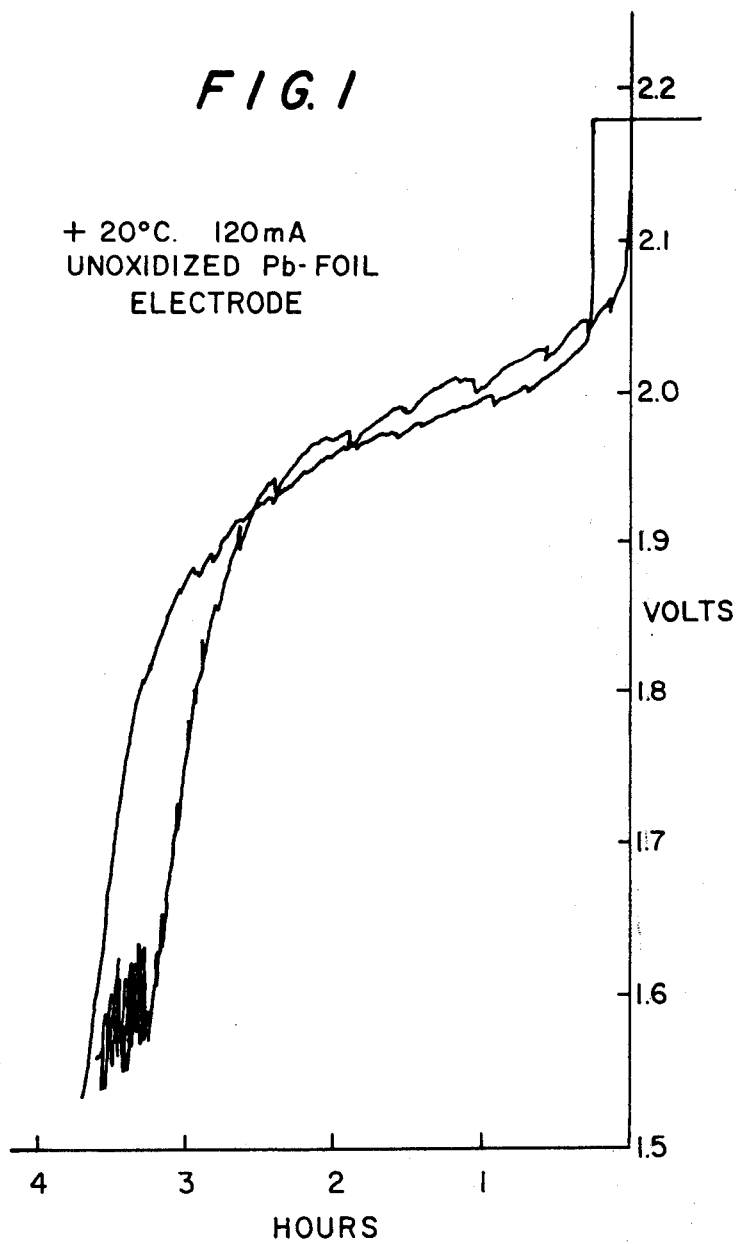
Figure 2:
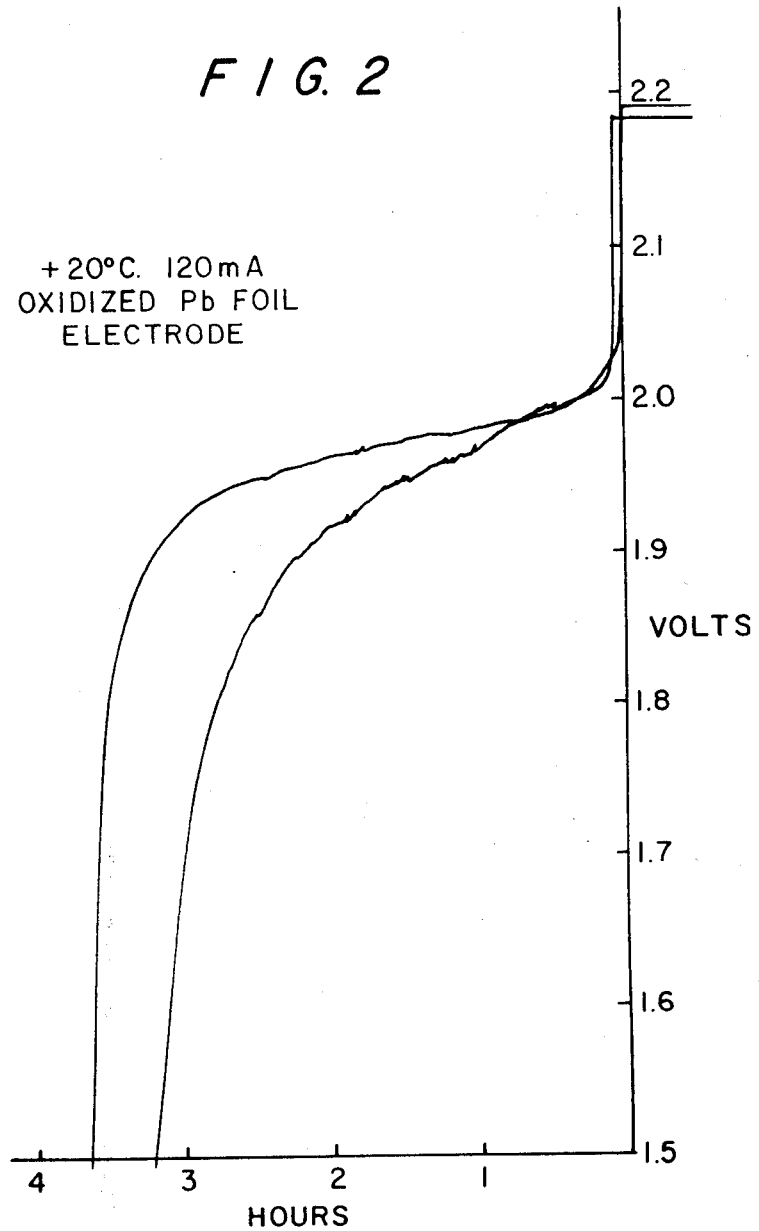
Figure 3:
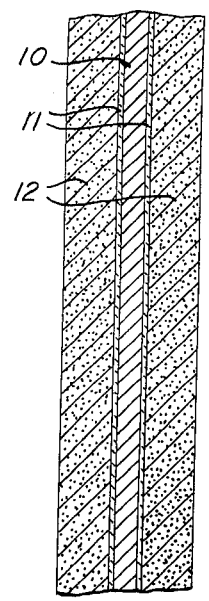
FIGS. 3, 5 and 7 represent cross sections of cathodes according to the invention
Figure 4:
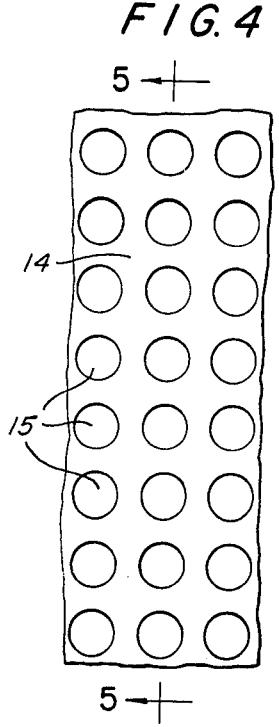
FIGS. 4 and 6 represent plan views of preferred current collector construction.
Figure 5:
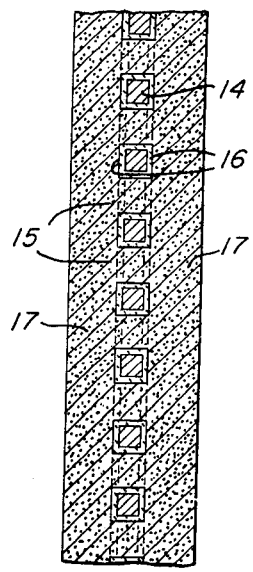
Figure 6:
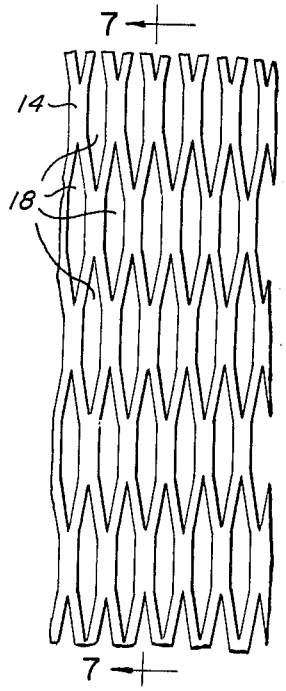
Figure 7:
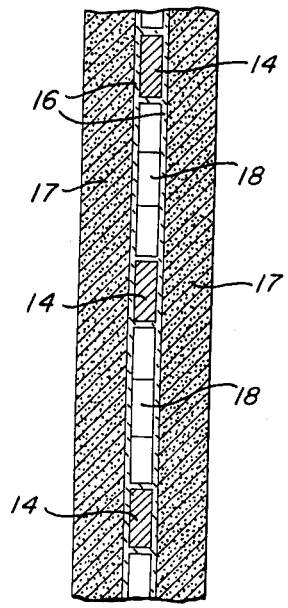

For the purposes of the invention, the lead, preferably in the form of a foil or grid, is anodized (anodically oxidized) prior to being formed into the complete cathode with the manganese dioxide active material. The anodization may conveniently be carried out by passing a current between the lead cathode collector, as anode, and a cathode immersed in sulphuric acid preferably having a normality of between 1N and 12N, preferably about 8N. The anodization is carried out to the extent necessary to obtain reduction of the voltage irregularities referred to above consistent with satisfactory output from the cells; extensive anodization reduces the effective ability of the lead to act as a current collector by providing a high resistance surface layer on the lead. It has been found that lead foils anodized in 8N sulphuric acid at a current of about 120mA per square inch of foil (equivalent to 60 mA per square inch of foil surface) for times up to about 5 minutes (i.e. up to 18,000 millicoulombs per square inch of lead surface) are satisfactory, the preferred time of anodization under these conditions being from about 0.5 or 1.0 minutes ($\equiv$ 1800 or 3600 millicoulombs per sq. in.) to 4 minutes ($\equiv$ 14,400 millicoulombs per sq. in.) and particularly about 2.5 minutes ($\equiv$ 9000 millicoulombs per sq. in.). Optimum times of anodization can readily be determined for the particular anodization conditions selected and the foil employed, the aim being to achieve a degree of anodization as calculated by the quantity of electricity employed (current x time) per unit of surface area of the lead foil or grid, which will be equivalent to the conditions given above.

On first anodizing, the lead foils assume a lustrous bronze colour which darkens somewhat on further anodization and which changes to a dull gray or brown when the lead is removed from the anodization bath. Unfortunately, the colour changes do not appear to be sufficiently marked to constitute a guide to the proper degree of anodization.

The lead employed for the cathodic current collector is, as mentioned above, conveniently in the form of a foil or grid for the production of the most compact cathodes. 0.002 inch lead foil, perforated with many small holes to promote adherence of the cathode material, is a particularly satisfactory form of current collector for small compact cells, but the thickness and exact form of the metal are not critical and are a matter of choice depending on the size and design of the cell in which the cathode is to be employed. Both perforated metal and expanded metal are satisfactory for achieving adherence. Open area may be between about 25 and 50 or even 75%.

The complete cathode may be prepared by pasting a mixture of manganese dioxide and conductive carbon such as graphite, preferably together with an organic binder such as carboxy-methyl cellulose (CMC) in aqueous solution, on to the anodized lead current collector and pressing the mixture thereon followed by drying of the so-formed cathode. Various types of manganese dioxide may be employed through the type-presently preferred is the electrolytic manganese dioxide as used in the dry battery industry. For satisfactory conductivity this is blended with a minor amount of conductive carbon, preferably the mixture containing between 10 and 20% of conductive carbon, particularly about 15%. Commercial graphite is satisfactory as the conductive carbon, but various conductive carbon blacks also give satisfactory results.

The dry mixture of manganese dioxide and carbon may be blended with a solution of an organic binder, for instance a 1 to 2% aqueous solution of CMC, preferably in an amount to form a mixture which is just readily spreadable on the anodized lead current collector, suitably held in a pasting-frame. The amount of water employed at this stage of the preparation is normally too much to allow compression and therefore a preliminary air drying is normally employed. When the structure has partially dried but the pasted on mixture is still moist enough to flow and consolidate under the pressure to be employed, the pressing operation is conducted, preferably under several thousand pounds per square inch (psi). Too wet a mixture will squash under pressure. The pressure to be employed is not critical but applicants have found the pressure of 7,000 psi to be satisfactory. Following this the cathode is removed from the frame and allowed to dry completely. A tab attached to the corner of the anodized lead current collector and protruding from the pressed-on manganese dioxide active material may serve as an electrical connection.

The loading of the manganese dioxide active material on the current collector of the cathode may vary somewhat although in general the lower the loading, the more efficient the utilization of the cathodic active material will be. Amounts of from 1 to 3 grams of an 85:15 $MnO_2$-C dry mix per square inch of anodized lead foil or grid appear to give satisfactory cathodes although with very low cathode loadings there may be some difficulty in applying pressure to promote adhesion of the cathodic material to the anodized lead foil or grid. Thus, provided that adequate adherence of the mixture to the anodized lead is secured, even lighter loadings than those mentioned above may be employed. Naturally, where necessary, the total surface area of cathode would be adjusted proportionately to obtain the desired capacity for the battery.

The zinc employed for the anode may be any commercial grade normally used in the dry battery industry and, to reduce corrosion by the acid, must be amalgamated, for instance by preliminary cleaning in an alkali metal hydroxide solution followed by a brief immersion in a dilute solution of mercuric chloride in water or 8N sulphuric acid. For compact cells, sheet zinc is conveniently employed.

The electrolyte which may be employed in the cells according to the invention is sulphuric acid of from 2N to 10N, and while performance appears to be best in the region of 5 to 6N, somewhat stronger sulphuric acid e.g. 8N may be desirable where the cells are to be used under low temperature conditions.

The cells may be assembled in various ways although conveniently the cathode according to the invention may be placed between two zinc anodes with a suitable separator in between such as expanded polypropylene mesh. Naturally the area and number of cathodes and anodes will be determined by the desired capacity of the cell.

The following Examples illustrate the invention and also include comparisons of the cathodes of the invention with those employing other materials as current collectors.

EXAMPLE 1

In this and in the following examples, except where otherwise indicated, all work was performed with 1 inch by 1 inch cathodes.

A dry blend was made of 85 parts by weight of an electrolytic manganese dioxide used in the dry battery industry and 15 parts by weight of a commercial graphite also used in the industry.

A solution of 5 grams of carboxymethyl cellulose (CMC) in 300 ml $H_2O$ (1.67% W/V CMC) was prepared.

1.5 grams of the dry mix was blended with a suitable amount (0.65–0.75 ml) of the CMC solution, and this was spread on both sides of a 1 inch × 1 inch metal current collector with a tab attached at one corner for electrical connection. The current collector was held in a small pasting-frame. After drying in air until a suitable amount of water had evaporated (about 1 hour), the material was compressed, preferably at 7000 lb load (7000 psi) or above, and then after removal from the frame, dried completely. The cathode material under compression must still be moist enough to flow and consolidate but not so wet as to squash, and this is a matter of trial and error.

Anodes were prepared of commercial grade sheet zinc used in the dry battery industry, cleaned in aqueous sodium hydroxide, washed with water and then amalgamated by brief exposure to a dilute solution of mercuric chloride in water or in 8N $H_2SO_4$.

Cathodes were prepared as described above on five metal current collectors: 80 mesh platinum gauze; 0.002 inch lead foil perforated with many small holes so that the cathode material would adhere firmly; and expanded nickel, silver and stainless steel grids.

Each cathode in turn was placed between two zinc anodes, with expanded polypropylene mesh as separator, activated by immersion in 8N $H_2SO_4$, and discharged at a constant current of 120 mA.

The voltage of each cell under load was plotted against the discharge time in hours and revealed the run-out times (the time taken from the beginning of the discharge to the point at which the cell's voltage fell to 1.5 volts) to be clearly superior for those cells in which a platinum or lead cathode current collector was used.

However, the cells employing the lead cathode current collectors show considerable voltage irregularities during discharge, and this was attributed to partial temporary breakdowns of the surface oxide or sulphate film on the lead.

When anodized lead foils were substituted for the un-anodized foils, these voltage irregularities on discharge largely or completely disappeared.

EXAMPLE 2

To show the effects of anodization for different times, cathodes were made on un-anodized lead foils or foils anodized at 120 mA for various times up to 5 minutes, employing 8N $H_2SO_4$ for anodization. The cathodes prepared as described previously were discharged against zinc anodes in 8N sulphuric acid at 120 mA, with the following results:

TABLE I

| Anodization Time (minutes) | 0 | 1 | 2 | 2.5 | 3 | 4 | 5 |
|---|---|---|---|---|---|---|---|
| Average Run-Out Time (hours to 1.5 v) | 2.62 | 3.4 | 3.3 | 3.37 | 2.95 | 2.9 | 2.5 |

EXAMPLE 3

Employing lead foil anodized for 2 to 2 ½ minutes at 120 mA and preparing the cathodes as described above, the effect of sulphuric acid concentration on the discharge characteristics of the cells was studied, varying the sulphuric acid concentration from 2N to 10N. Run-out times at 2N were only about 1.5 hours; at 3N about 2.3 hours and at 4N to 6N between about 2.5 and 3 hours, with the best results being close to 3.2 hours or about theoretical for a one electron discharge. At 8N the run-out times were only very slightly lower and at 10N were still satisfactory, at more than 2 hours.

In the $MnO_2$ cathode discharge in sulphuric acid, an adequate supply of hydrogen ion from the acid must be available to secure reduction of the $MnO_2$ at the high voltage characteristic of this ion system. If an inadequate quantity acid is present the run-out time to the cutoff voltage adopted here (1.5 V) will be lowered. The lower run-out for the 2N acid referred to above is attributed to this effect.

EXAMPLE 4

A series of runs were carried out varying the manganese dioxide-graphite ratio of the dry mix to be pasted on the anodized lead foil current collectors. The amount of binder solution added was adjusted as necessary to get a suitable wet mix for pasting on. The run-out times to 1.5 volt per cell at a discharge of 120 mA were determined for each of the mixes used, with the following results:

TABLE II

| % by weight $MnO_2$ in dry mix | 90 | 85 | 80 |
|---|---|---|---|
| Average Run-Out Time (hours to 1.5 v) | 2.4 | 2.8 | 2.6 |

EXAMPLE 5

The effect of cathode loading i.e. the weight of $MnO_2$-graphite dry mix on the cathodes was determined by conducting a number of runs in which the weight of dry mix pasted on the 1 inch square anodized lead foil current collectors was varied in half gram intervals from 3 grams down to 1 gram. Since the amount of active material varied, the weight figures were compared with the actual capacity of the cells measured in mA hours per gram of $MnO_2$. The results indicated a steadily increasing utilization of the active $MnO_2$ with decreased cathode loading.

EXAMPLE 6

Several further runs were conducted but employing as the cathode current collectors 0.002 inch lead foil cut to a size of 2.5 inch by 2.75 inch and perforated with many small holes to promote adhesion of the material. These were pasted with 16 grams of an 85:15 $MnO_2$-graphite mixture moistened with 8.3 grams of CMC solution. The wet mix was pasted on both sides of the foil, dried to a weight loss of 5.5 to 5.7 grams and compacted in the pasting-frame under 5,000 pounds load. The frame was then removed and the cathode further dried to a final water content of 1.5 grams and finally pressed at about 40,000 pounds load. This procedure was adopted since the pasting-frame would not have withstood the higher pressure without splitting.

In the first experiment (run 1, table III) the lead foil was anodized in 8N $H_2SO_4$ at 120 mA for 13 minutes (an anodization that was calculated to be optimum based on the results of the previous anodization experiments described above).

In runs 2 to 4 of the table, various changes in the anodization procedure are made, runs 2 and 3 utilizing different currents and times although the product of current and time is in each case approximately the same. In run 4 the conditions are as in run 1 except that the strength of the sulphuric acid was reduced, being 1N in place of 8N.

In run 5 an expanded lead grid was employed in place of a lead foil, the time of anodization being estimated to provide the same degree of anodic protection as was achieved on run 1 on the lead foil, based on the estimated area of the expanded lead grid.

The cathodes prepared from these anodized lead foils or grids were all discharged at 750 mA against two amalgamated zinc anodes in 6N $H_2SO_4$ i.e. at a current density somewhat lower than that of the 1 inch × 1 inch cathodes discharged at 120 mA, as referred to in the earlier examples. It is apparent that all of these cathodes performed reasonably well.

TABLE III

DISCHARGE OF CATHODES 2.5" × 2.75", PREFERRED UNDER VARIOUS CONDITIONS

| RUN | CONDITIONS | THEORETICAL RUN FOR ONE ELECTRON REDUCTION | ACTUAL HOURS TO | | |
|---|---|---|---|---|---|
| | | | 1.9V | 1.7 | 1.5 |
| 1 | Anodized, 8N $H_2SO_4$, 120 mA 13 minutes | 5.6 HR | 2.08 | 3.48 | 3.77 |
| 2 | Anodized, 8N $H_2SO_4$, 360 mA 4 minutes | 5.6 | 2.87 | 4.10 | 4.37 |
| 3 | Anodized, 8N $H_2SO_4$, 60 mA 24 minutes | 5.6 | 2.23 | 3.53 | 3.93 |
| 4 | Anodized, 1N $H_2SO_4$, 120 mA 13 minutes | 5.6 | 1.62 | 3.07 | 4.05 |
| 5 | Prepared on expanded lead grid, anodized, 8N $H_2SO_4$, 120 mA, 5 minutes | 5.6 | 1.97 | 3.40 | 3.72 |

What we claim as our invention is:

1. In a reserve primary cell of the acid Leclanche type having a cathode and an amalgamated zinc anode mounted in a container and arranged to be activatable by the addition of sulfuric acid as electrolyte, the improvement which consists of said cathode being a lead current collector having thereon a layer of anodized lead and having a conductive compressed cathodic layer of manganese dioxide and carbon adhered to said anoidic layer.

2. The reserve primary cell according to claim 1 wherein the thickness of the anodic film is not greater than that which would be produced by anodization of the lead in 8 Normal sulphuric acid with the passage of 18,000 millicoulombs of electricity per square inch of lead surface.

3. The reserve primary cell according to claim 2 wherein the lead current collector is in the form of a perforated or expanded sheet.

4. The reserve primary cell according to claim 1 wherein the thickness of the anodic film is equal to that which would be produced by anodization of the lead in 8 Normal sulphuric acid with the passage of 3600 to 14,400 millicoulombs of electricity per square inch of lead surface.

5. The reserve primary cell according to claim 1 wherein the thickness of the anodic film is equal to that which would be produced by anodization of the lead in 8 Normal sulphuric acid with the passage of about 9,000 millicoulombs of electricity per square inch of lead surface.

* * * * *